(12) United States Patent
Fischer

(10) Patent No.: US 7,345,863 B2
(45) Date of Patent: Mar. 18, 2008

(54) APPARATUS AND METHOD FOR IDENTIFYING A LOSS OF A CURRENT TRANSFORMER SIGNAL IN A POWER SYSTEM

(75) Inventor: Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 412 days.

(21) Appl. No.: 11/181,718

(22) Filed: Jul. 14, 2005

(65) Prior Publication Data

US 2007/0014062 A1    Jan. 18, 2007

(51) Int. Cl.
    *H02H 7/00*    (2006.01)
(52) U.S. Cl. .......................... 361/80; 361/115
(58) Field of Classification Search .............. 361/80, 361/115
    See application file for complete search history.

(56) References Cited

U.S. PATENT DOCUMENTS

| | | | | |
|---|---|---|---|---|
| 4,502,086 | A | 2/1985 | Ebisaka | 361/87 |
| 4,825,326 | A | 4/1989 | Andow | 361/63 |
| 4,862,308 | A | 8/1989 | Udren | 361/95 |
| 5,657,193 | A * | 8/1997 | Purkayastha | 361/23 |
| 5,914,663 | A | 6/1999 | Whitehead | 340/638 |
| 6,011,480 | A | 1/2000 | Schweitzer | 340/644 |
| 6,411,865 | B1 | 6/2002 | Qin et al. | 700/286 |
| 6,442,010 | B1 | 8/2002 | Kasztenny | 361/63 |
| 6,456,947 | B1 | 9/2002 | Adamiak | 702/59 |
| 6,501,631 | B1 | 12/2002 | Wang et al. | 361/63 |
| 6,590,397 | B2 | 7/2003 | Roberts | 324/521 |
| 6,617,839 | B2 | 9/2003 | Kang | 324/117 R |
| 6,757,146 | B2 | 6/2004 | Benmouyal | 361/93.6 |
| 6,804,094 | B2 | 10/2004 | Kampmeyer | 361/42 |
| 6,804,600 | B1 | 10/2004 | Uluyol | 701/100 |
| 7,196,884 | B2 * | 3/2007 | Guzman-Casillas et al. | 361/36 |
| 2002/0145841 | A1 | 10/2002 | Williams | |
| 2004/0057175 | A1 | 3/2004 | Fedirchuck | |
| 2006/0198065 | A1 | 9/2006 | Guzman | |

* cited by examiner

*Primary Examiner*—Stephen W. Jackson
(74) *Attorney, Agent, or Firm*—Cook, Alex, McFarron, Manzo, Cummings & Mehler, Ltd.

(57) ABSTRACT

Provided is an apparatus and method for identifying a specific lost current transformer (CT) signal of number of CT signals provided by a corresponding number of CTs coupling a protective device to at least one protection zone. The method includes selectively providing pairs of first and second binary control signals corresponding to each of the CT signals in response to comparisons of RMS current changes of respective CT signals. A third binary control signal associated with a protection zone is provided in response to receipt of the pairs of first and second binary control signals. A first value for only one of the first binary control signals, a second value for all of the second binary control signals and the first value for the third binary control signal for a predetermined time indicates the loss of the CT signal corresponding to the first binary control signal having the first value.

54 Claims, 6 Drawing Sheets

APPARATUS AND METHOD FOR IDENTIFYING A LOSS OF A CURRENT TRANSFORMER SIGNAL IN A POWER SYSTEM

CROSS-REFERENCE TO RELATED APPLICATIONS

This application is related to U.S. Non-provisional patent application entitled "An Apparatus and Method for Detecting the Loss of a Current Transformer Connection Coupling a Current Differential Relay to an Element of a Power System", filed on Mar. 2, 2005, naming Guzman-Casillas et al. as inventors.

BACKGROUND OF THE INVENTION

The present invention generally relates to power system protection, and more specifically, to an apparatus and method for identifying a loss of a current transformer signal in a power system.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems must also include protective devices and procedures to protect the power system elements from abnormal conditions such as electrical short circuits, overloads, frequency excursions, voltage fluctuations, and the like.

Protective devices and procedures act to isolate some power system element(s) from the remainder of the power system upon detection of the abnormal condition or a fault in, or related to, the power system element(s). Logically grouped zones of protection, or protection zones utilizing the protective devices and procedures, are established to efficiently manage faults or other abnormal conditions occurring in the power system elements.

In general, protection zones may be classified into six types including: (1) generators and generator-transformer elements (2) transformers, (3) buses, (4) lines (transmission, sub-transmission and distribution), (5) utilization equipment (motors, static loads), and (6) capacitor or reactor banks. As a result, a variety of protective devices are required. Such protective devices may include different types of protective relays, surge protectors, arc gaps and associated circuit breakers and reclosers.

Although the fundamentals of power system protection are similar, each of the six types of protection zones use protective devices that are based on the characteristics of the power system elements in that category. More specifically, different protective relays utilizing a variety of protective schemes (e.g., differential current comparisons, magnitude comparisons, frequency sensing), are required to protect the various power system elements. For example, a line current differential relay, having nn electrical connections, is designed to monitor current flowing into an overhead transmission line (i.e., a line protection zone) by measuring the current flowing into the overhead transmission line and calculating inter alia, the sum of all measured current, or the operate current. As is known, when the overhead transmission line is operating under normal conditions, the sum of all of the (primary) currents entering the overhead transmission line is about zero (Kirchhoffs current law). If the overhead transmission line has a short circuit, or is faulted, its operate current will be substantially different from zero, indicating that there is some impermissible path through which a current is flowing. If the operate current exceeds some threshold, or pickup current, the line current differential relay issues a tripping signal to an associated power circuit breaker(s) causing it to open and isolate the faulted overhead transmission line from the remainder of the power system.

Because power system currents can easily exceed 10,000 amperes (amps) and power system voltages can reach several thousand volts, and because a protective device, such as the line current differential relay described above, is designed to measure currents no greater than 100 amps via its nn electrical connections, the protective device is coupled to the power system element(s) via a number of current transformers. The current transformers operate to proportionally step-down the power system current flowing into the protection zone (while retaining the same phase relation), to a magnitude that can be readily monitored and measured by the protective device. As is known, the three-phase current flowing into the protection zone is commonly referred to as a primary current, and the current flowing from the current transformers to the protective device is commonly referred to as a secondary current. The resulting lower secondary currents or "CT signals" can be filtered, sampled, etc., by the protective device to determine corresponding phasors representative of the primary current flowing into the protected power system element. The phasors are then used in the various overcurrent, directional, distance, and differential logic schemes of the various protective devices.

Portions of the protection zones typically overlap each other to provide redundancy and to ensure that faults and their locations are properly identified. Thus, each protection zone normally includes protective relays that provide backup for the relays protecting the power system elements of adjacent protection zones. The overlap is typically accomplished via the location of the current transformers. As a result, some of the power system elements and current transformers may be "switched" in and out, or reassigned to, different overlapping protection zones. Such re-assignment may be the result of a change in the power system load, power system reconfiguration, and the like. A description of a system for protection zone selection is provided in U.S. Pat. No. 6,411,865, issued Jun. 25, 2002, by Qin, et al., entitled "System for Protection Zone Selection in Microprocessor-Based Relays in an Electronic Power System," which is incorporated herein in its entirety and for all purposes.

Due to their integral role in the power system, if a defective current transformer delivers an incorrect or errant secondary current to a protective device (e.g., a current differential relay, an overcurrent distance relay), problems may arise in relay operation. Because the incorrect or errant secondary current is not reflective of the actual operate current, a circuit breaker in the protection zone may fail to trip in the event of a short circuit in the protection zone, or an erroneous trip may occur when no short circuit exists. In other words, the protective device may incorrectly "perceive" a short circuit or other fault in the protection zone when the errant current is actually due to a current transformer problem.

Thus, in some cases when one of the current transformer connections nn between the current transformer and the protective device becomes open or short circuited, the CT signal entering the protective device decreases to substantially zero. In such cases, the protective device can potentially misoperate. For example, in a current differential relay, the missing current creates a false "high" operate current that may potentially exceed the trip threshold. As a result, an unwanted trip signal may be issued, despite the absence of a short circuit in the protection zone. Such an open current transformer connection, or a lost current transformer signal, occurring between the current transformer and the protective device is referred to herein as a lost CT signal or an open CT condition.

Various prior art algorithms have attempted to detect when a lost CT signal is present, however all have limitations. For example, in one prior art algorithm implemented in a current differential relay, a lost CT signal is detected only for CTs carrying an incoming current. Further, while a lost CT signal may be detected using such a prior art algorithm, the specific lost CT signal from among a number of CT signals is not identified. As a result, its associated specific current transformer can not be identified.

SUMMARY OF THE INVENTION

In accordance with the invention, an apparatus is provided in a protective device for identifying a loss of a specific current transformer (CT) signal of a plurality of CT signals. The plurality of CT signals is provided to the protective device by a corresponding plurality of CTs coupling the protective device to at least one protection zone of a power system. The apparatus includes a number of first logic circuits. Each of the first logic circuits is configured to provide a binary control signal pair having a first binary control signal and a second binary control signal in response to comparisons of a first RMS value of a digitized current sample stream of a corresponding CT signal sampled at first time to a second RMS value of the digitized current sample stream sampled at a second time. The apparatus also includes at least one second logic circuit operatively coupled to the first logic circuits and configured to provide a third binary control signal in response to receipt of the plurality of binary control signal pairs. During operation, a first value for only one of the plurality of first binary control signals and a second value for all of the second binary control signals and the first value for the third binary control signal for a pre-defined time interval indicates the loss of the specific CT signal corresponding to the first logic circuit providing the first binary control signal having the first value, and prevents issuance of a trip signal of the protective device In accordance with another embodiment of the invention, an apparatus for identifying a loss of a specific current transformer (CT) in a power system is provided. The apparatus includes a first logic circuit configured to provide a binary control signal pair having a first binary control signal and a second binary control signal in response to comparisons of a first RMS value of a digitized current sample stream of the CT signal sampled at first time to a second RMS value of the digitized current sample stream sampled at a second time. The apparatus also includes a second logic circuit operatively coupled to the first logic circuit and configured to provide a third binary control signal in response to receipt of the binary control signal pair. A first value for the first binary control signal and a second value for the second binary control signal and the first value for the third binary control signal indicate the loss of the specific CT signal.

In accordance with yet another aspect of the invention, provided is an apparatus for identifying a loss of a current transformer (CT) signal in a power system. The apparatus includes a CT specific delta current logic circuit configured to provide a binary control signal pair having first binary control signal and a second binary control signal in response to comparisons of a first RMS value of a digitized current sample stream of the CT signal sampled at first time to a second RMS value of the digitized current sample stream sampled at a second time. The apparatus also includes a history buffer coupled to the CT specific delta current logic circuit. The history buffer is configured to provide the first RMS value to the CT specific delta current logic circuit at the second time where the second time is a predetermined number of power system cycles after the first time. The apparatus further includes an enable logic circuit coupled to the CT specific delta current logic circuit. The enable logic circuit is configured to enable operation of the CT specific delta current logic circuit when the first RMS value is greater than a first pre-determined percentage of a nominal current rating. A first value for the first binary control signal for a pre-defined time interval indicates the loss of the CT signal In accordance with yet another aspect of the invention, provided is a method for detecting and identifying a loss of a specific current transformer (CT) signal of a plurality of CT signals provided to a protective device by a corresponding plurality of CTs coupling the protective device to at least one protection zone of a power system. The method includes providing a plurality of binary control signal pairs having a first binary control signal and a second binary control signal corresponding to the plurality of CT signals. Each of the plurality of binary control signal pairs is provided in response to comparisons of a first RMS value of a digitized current sample stream of a corresponding CT signal sampled at first time to a second RMS value of the digitized current sample stream sampled at a second time where the second time occurs a predetermined number of power system cycles after the first time. The method also includes providing a third binary control signal in response to receipt of the plurality of binary control signal pairs. A first value for only one of the first binary control signals and a second value for all of the second control signals and the first value for the third binary control signal for a pre-defined time interval indicates the loss of the specific CT signal corresponding to the only one of the first binary control signals having the first value.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

In addition to identifying an occurrence of a lost current transformer (CT) signal from among a number of CT signals, implementation of the apparatus and methods disclosed herein further enables identification of a specific lost CT signal provided by one of a number of CTs coupling a protective device to a protection zone of a three-phase power system. As a result, the associated CT responsible for the specific lost CT signal can be identified and steps may be taken to prevent protective device misoperation and to address the specific lost CT.

For ease of discussion, aspects of the present invention can be more fully understood by limiting the detailed discussion to a protection zone that is monitored by a protective relay, such as a current differential relay, coupled to the protection zone via a number nn of current transformers. Such a protection zone is defined herein to include a portion of a power system substation where only A-phase primary currents are monitored. Further, the apparatus and methods disclosed herein are also applicable to any protective device requiring stepped-down currents for operation.

Figure 1:
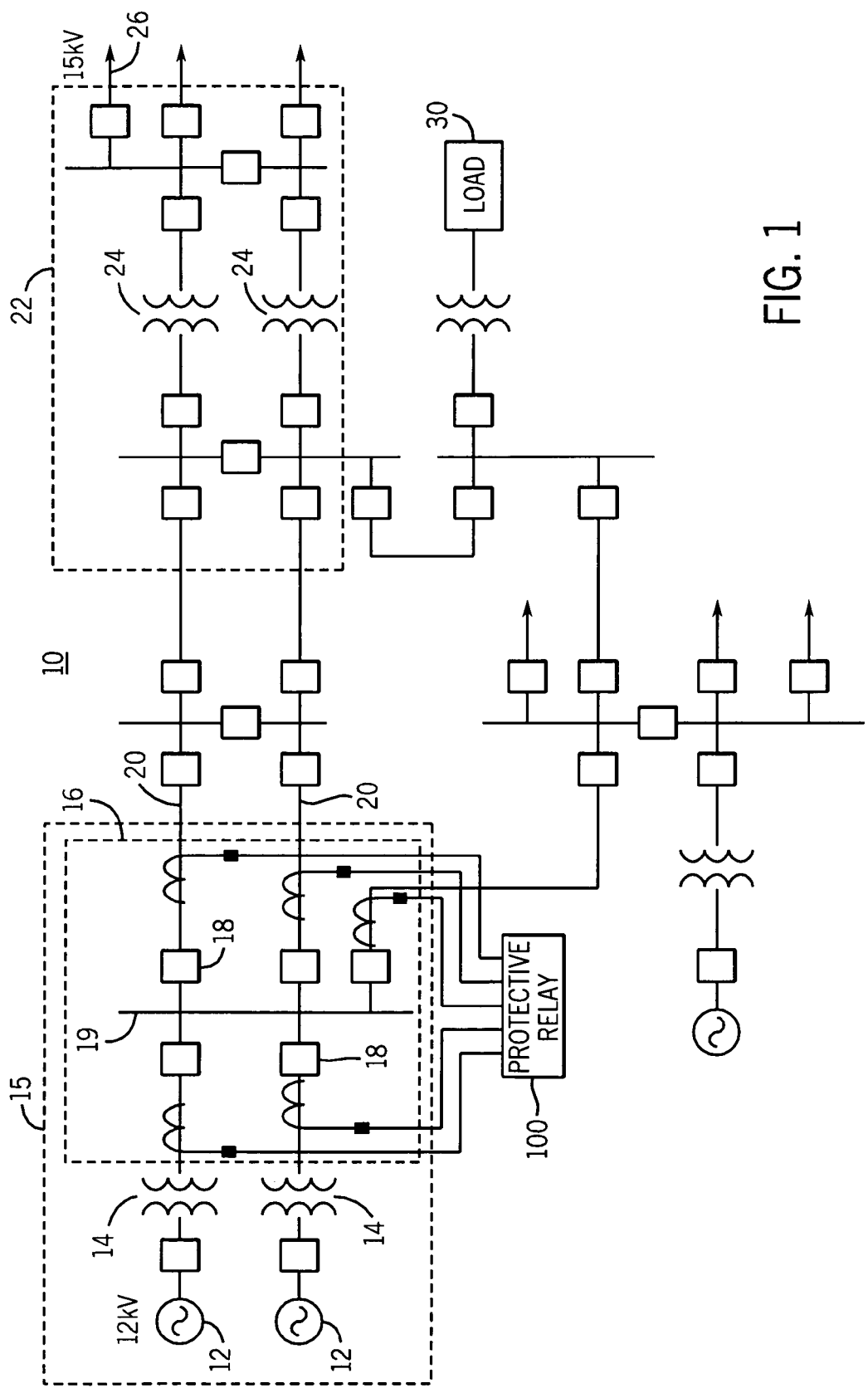
FIG. 1 is a single line schematic diagram of a power system that may be utilized in a typical metropolitan area.

FIG. 1 is a single line schematic diagram of a power system 10 that may be utilized in a typical metropolitan area. As illustrated in FIG. 1, the power system 10 includes, among other things, two generators 12 configured to generate three-phase sinusoidal waveforms, for example, three-phase 12 kV sinusoidal waveforms, two step-up power transformers 14 configured to increase the 12 kV sinusoidal waveforms to a higher voltage such as 345 kV and a number of circuit breakers 18. The step-up power transformers 14 provide the higher voltage sinusoidal waveforms to a number of long distance transmission lines such as the transmission lines 20. In an embodiment, a first substation 15 may be defined to include the generators 12, the step-up transformers 14 and the circuit breakers 18, all interconnected via a first bus 19. At the end of the long distance transmission lines 20, a second substation 22 includes step-down power transformers 24 to transform the higher voltage sinusoidal waveforms to lower voltage sinusoidal waveforms (e.g., 15 kV) suitable for distribution via a distribution line 26 to various end users 26 and loads 30.

As previously mentioned, the power system 10 includes protective devices and procedures to protect the power system elements from faults or other abnormal conditions The protective devices and procedures utilize a variety of protective logic schemes to determine whether a fault or other problem exists in the power system 10. For example, some types of protective relays utilize a current differential comparison to determine whether a fault exists in the protection zone. Other types of protective relays compare the magnitudes of calculated phasors, representative of the power system sinusoidal waveforms, to determine whether a fault exists in the protection zone. Frequency sensing techniques and harmonic content detection is also incorporated in protective relays to detect fault conditions. Similarly, thermal model schemes are utilized by protective relays to determine whether a thermal problem exists in the protection zone.

Referring again to FIG. 1, a protection zone 16 is established to include a portion of the first substation 15. A protective relay, for example a current differential relay, is coupled to the protection zone 16 via a number of current transformers. Although five current transformers couple the protective relay to the electrical conductors (e.g., the transmission line 20) of the protection zone 16, more or less current transformers and/or voltage transformers may be utilized, depending on the configuration of the protective device.

Figure 2:
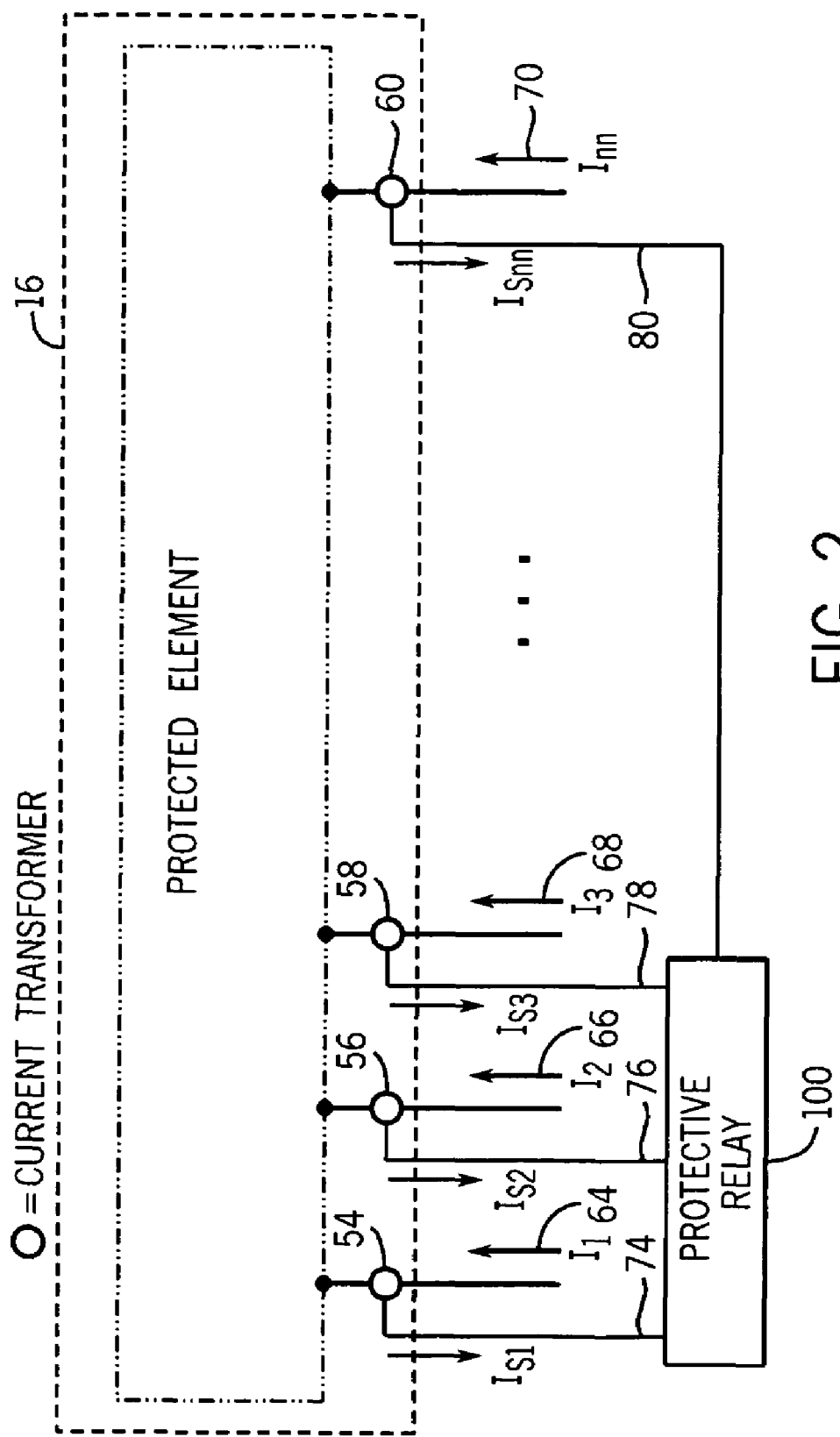
FIG. 2 is a block diagram of a protective relay coupled to the protection zone of the power system of FIG. 1, according to an embodiment of the invention.

FIG. 2 is a block diagram of a protective relay coupled to the protection zone 16 of FIG. 1 according to an embodiment of the invention. Although only one protection zone 16 is included for ease of discussion, the power system 10 may include many overlapping protection zones where the overlapping protection zones (e.g., Zone 1, Zone 2 ... Zone mm) may be dynamically reconfigured as described in connection with FIG. 4. Referring to FIGS. 1 and 2, the protection zone 16 is configured to protect a portion of the first substation 15 via operation of the protective relay, coupled to the protection zone via nn current transformers 54, 56, 58 to 60. For ease of discussion, the protective relay is configured as a current differential relay 100, adapted to monitor only the A-phase primary currents flowing into the protection zone 16. Thus, two additional protection zones having the same "footprint," may also be configured with two additional respective current differential relays to monitor the B-phase and C-phase currents flowing into corresponding protection zones. Alternatively, one current differential relay may be configured to monitor more than one protection zone.

Although illustrated using the current differential relay 100, it should be noted that other types of protective devices (e.g., an overcurrent relay) may be utilized to implement the apparatus and methods disclosed herein. Further, although illustrated as four current transformers, it should be noted that nn current transformers 54, 56, 58 to 60 represent all of the current transformers coupling the current differential relay 100 to the protection zone 16.

As previously mentioned, the protection zone 16 may be defined such that the current differential relay 100 utilizes the A-phase secondary current waveforms of the current transformers. Thus, each of the nn current transformers 54, 56, 58 to 60 is configured to step-down the current magnitudes of respective A-phase primary current waveforms 64, 66, 68 to 70 to corresponding secondary current waveforms 74, 76, 78 to 80, having magnitudes suitable for use by the current differential relay 100. Further, each of the A-phase primary current waveforms 64, 66, 68 to 70 is equal to respective corresponding secondary current waveforms 74, 76, 78 to 80, multiplied by respective current transformer ratios (turn ratios) of the respective current transformers 54, 56, 58 to 60. For example, $$I_1 = n_1 I_{S1} \text{ or } I_{S1} = \frac{I_1}{n_1}$$

where $n_1$ is the turn ratio of the current transformer 54.

In general, the current differential relay 100 processes the secondary current waveforms 74, 76, 78 to 80 received via respective current transformers 54, 56, 58 to 60. The secondary current waveforms 74, 76, 78 to 80 are filtered, sampled and then digitized for use by a microprocessor (or FPGA) of the current differential relay 100. The microprocessor then calculates a series of phasors, each having a magnitude and phase angle that are representative of each of the A-phase primary current waveforms 64, 66, 68 to 70, and then performs calculations to determine if a short circuit or fault exists in the protection zone 16.

Figure 3:
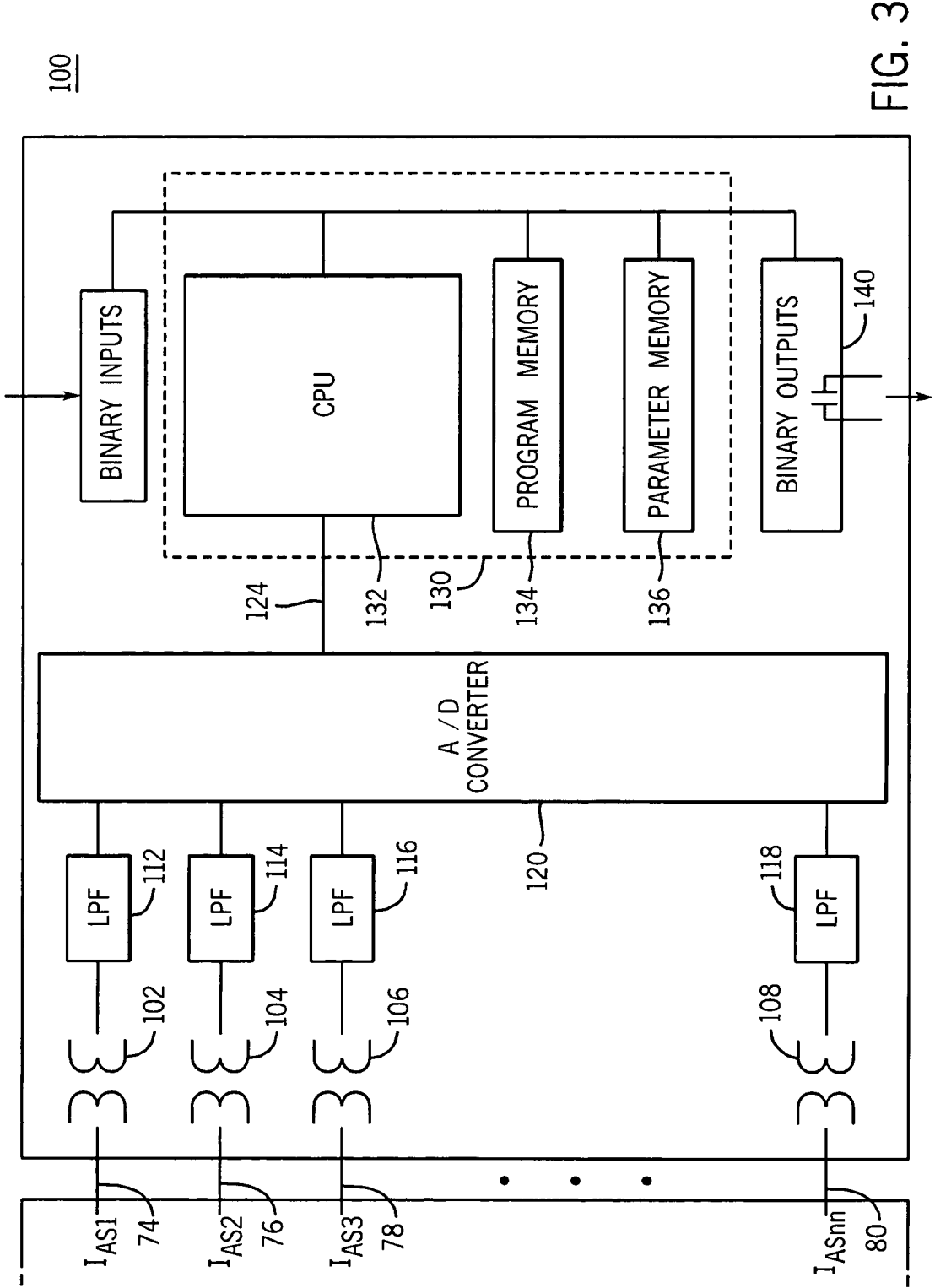
FIG. 3 is a block diagram of an exemplary configuration of the protective relay of FIG. 2.

For example, FIG. 3 is a block diagram of an exemplary configuration of the current differential relay 100 of FIG. 2 where the secondary current waveforms 74, 76, 78 to 80 are illustrated as $I_{As1}$, $I_{As2}$, $I_{As3}$ to $I_{Asnn}$. Although only secondary current waveforms 74, 76, 78 and 80 are shown in FIG. 3, it should be noted that all secondary current waveforms (i.e., CT signals), resulting from the current transformers coupling the current differential relay 100 to the protection zone 16, are received and processed by the current differential relay 100.

Referring to FIG. 3, during operation, the secondary current waveforms 74, 76, 78 to 80 received by the current differential relay 100 are further transformed into corresponding voltage waveforms via respective current transformers 102, 104, 106, to 108 and resistors (not separately illustrated), and filtered via respective analog low pass filters 112, 114, 116 to 118. An analog-to-digital (A/D) converter 120 then multiplexes, samples and digitizes the filtered secondary current waveforms to form corresponding digitized current sample streams (e.g., 1011001010001111).

The corresponding digitized current sample streams are received by a microcontroller 130, where they are digitally filtered via, for example, a Cosine filter to eliminate DC and unwanted harmonic frequency components. In an embodiment, the microcontroller 130 includes a microprocessor, or CPU 132, a program memory 134 (e.g., a Flash EPROM) and a parameter memory 136 (e.g., an EEPROM). As will be appreciated by those skilled in the art, other suitable microcontroller configurations (or FPGA configurations) may be utilized.

The microprocessor 132 executing a computer program, protection algorithm or relay logic scheme (discussed below) processes each of the digitized current sample streams to extract phasors representative of their corresponding A-phase primary current waveforms 64, 66, 68 to 70, and then performs various calculations using the phasors to determine whether a fault (e.g., a short circuit) exists in the protection zone 16. If a fault is detected, the microcontroller 130 will subsequently cause binary output contacts 140 to be closed thereby opening an associated power circuit breaker (e.g., the circuit breaker 18) to isolate the portion of the protection zone 16 experiencing the fault, from the remainder of the power system.

Figure 4A:
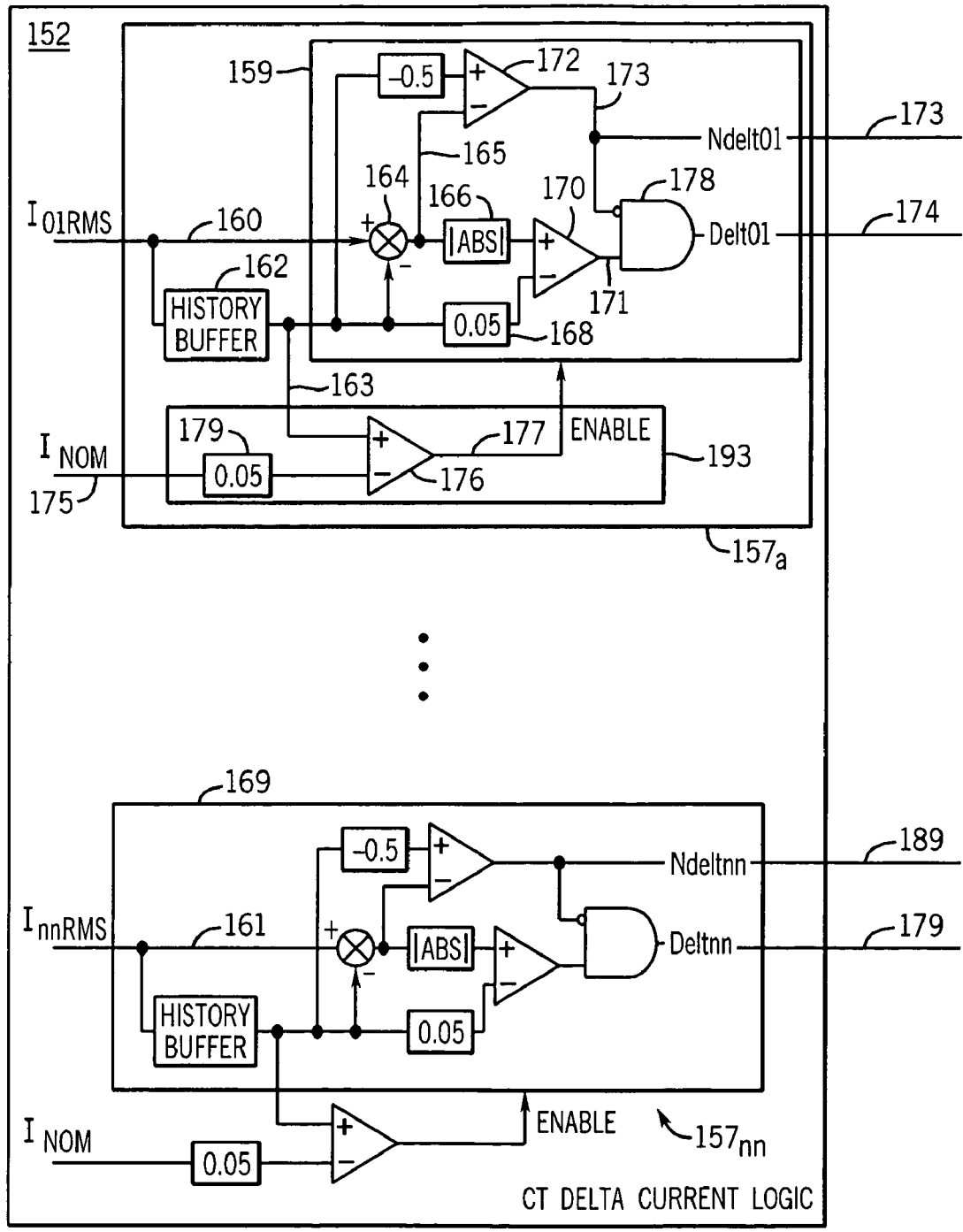
FIG. 4a-b is a logic block diagram of an exemplary lost CT signal detection and identification scheme executed by the protective relay of FIG. 2, according to an embodiment of the invention.
Figure 4B:
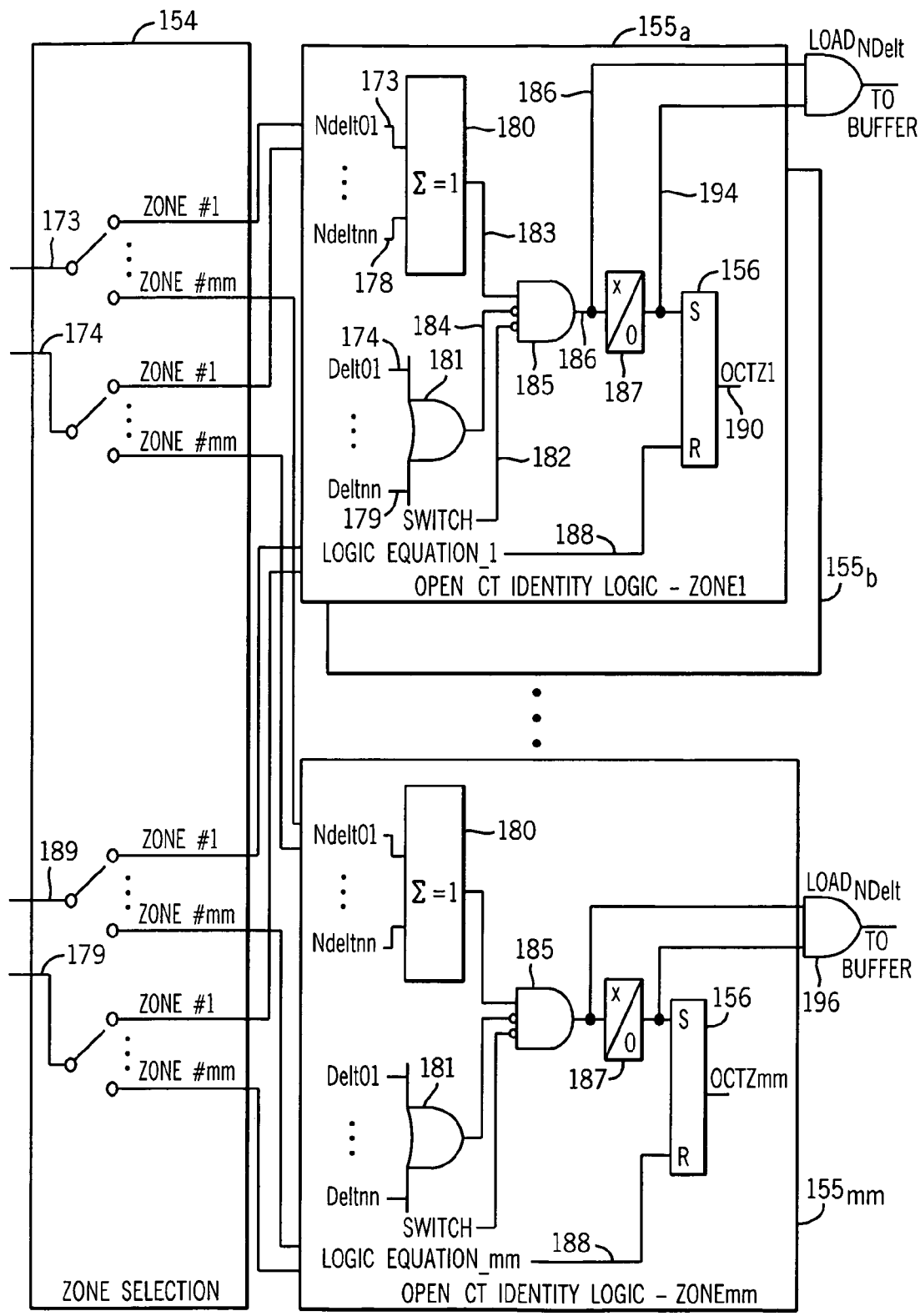

In addition to performing various calculations to determine whether a fault exists in the protection zone, the microcontroller 130 is also configured to identify a specific lost CT signal, identify its associated CT and prevent issuance of a trip signal when the specific lost CT signal is identified, according to an embodiment of the invention. FIG. 4 is a logic block diagram of an exemplary lost CT signal detection and identification scheme 150 executed by the microprocessor 132 to detect the loss of a CT signal in the protection zone 16, to identify the current transformer associated with the lost CT signal and to prevent issuance of a trip signal. Although applicable to a number of protective device types having a variety of secondary current and/or voltage inputs, the lost CT signal detection and identification scheme 150 is described herein with reference to the current differential relay 100 having $I_{snn}$ secondary currents.

Referring to FIG. 4, the lost CT signal detection and identification scheme 150 includes a current transformer (CT) delta current logic circuit 152 and a plurality of open CT identity logic circuits 155a to 155mm operatively coupled to the CT delta current logic circuit 152 via a zone selection logic circuit 154. As illustrated, the CT delta current logic circuit 152 includes a number of individual CT current comparison logic circuits 157a to 157nn, corresponding to the number nn of current transformers 54, 56, 58 to 60. In an embodiment, each of the individual CT current comparison logic circuits 157a to 157nn can be pre-assigned to one protection zone (e.g., the protection zone 16). In another embodiment, each of the individual CT current comparison logic circuits 157a to 157nn may be individually dynamically assigned to different protection zones by the zone selection logic circuit 154.

As discussed above, a number of protection zones corresponding to, for example, each of the three phases of the power system 10, may be established and monitored by individual current differential relays 100. For example, the CT delta current logic circuit 152 may be included in a first current differential relay to correspond to the A-phase current waveforms entering the protection zone 16, and may also be included in a second current differential relay to correspond to the B-phase current waveforms entering the protection zone 16. As discussed in detail below, the zone selection logic circuit 154 is configured to selectively group current CT comparison logic circuit outputs into individual protection zones (e.g., Zone 1, Zone 2 . . . Zone mm) for current transformer monitoring purposes.

In another example, more than one protection zone may be monitored by one current differential relay 100. Thus, the lost CT signal detection and identification scheme 150 is adaptable to monitor one or more protection zones, depending on the configuration of the current differential relay 100 (or other protective device). Moreover, although logic elements, arranged as shown in FIG. 4, are used for illustrative purposes, it should be noted that the lost CT signal detection and identification scheme 150 may be similarly described using logic elements in other arrangements or using one or more flowcharts representing one or more computer programs executed in the microprocessor 132.

Referring to FIGS. 3 and 4, each of the individual CT current comparison logic circuits 157a to 157nn of the CT delta current logic circuit 152 is configured to receive root-mean-square (RMS) values of the digitized current sample streams corresponding to one of the secondary current waveforms 74, 76, 78 to 80 from respective current transformers 54, 56, 58 to 60 (receiving the A-phase primary current waveforms 64, 66, 68 to 70, respectively). The RMS current values of the digitized current sample streams resulting from the secondary current waveforms 74, 76, 78 to 80 are illustrated as $I_{O1RMS}$ 160a to $I_{nnRMS}$ 160nn. Although only four secondary current waveforms 64, 66, 68 to 70 (see, FIG. 3) and two resulting RMS current values $I_{O1RMS}$ 160a to $I_{nnRMS}$ 160nn (see, FIG. 4) are illustrated, it should be noted that any number nn of secondary current waveforms resulting from a corresponding number nn of current transformers in the protection zone 16 (e.g., Zone 1) may be utilized by the lost CT signal detection and identification scheme 150, depending on the configuration of the current differential relay 100.

As mentioned in connection with FIG. 3, the digitized current sample streams resulting from corresponding secondary current waveforms are processed by the microcontroller 130 to extract corresponding phasors (e.g., fundamental phasors). In accordance with well known mathematical principles, a phasor's magnitude (expressed in polar coordinates) is the RMS value of the original sinusoidal signal (expressed in the time domain). The RMS values for each of the fundamental phasors are proportional to the peak value of the corresponding waveform. Thus, a change in any of the A-phase primary current waveforms of the protection zone 16 will be reflected as a change in the RMS value of its corresponding digitized current sample stream.

Each of the CT current comparison logic circuits 157a to 157nn, correspond to an individual current transformer. As illustrated, the CT current comparison logic circuit 157a is adapted to receive the RMS current values of the digitized current sample stream resulting from operation of the current transformer 54 only, and the CT current comparison logic circuit 157nn is adapted to receive the RMS current values of the digitized current sample stream resulting from operation of the current transformer 60 only.

Although not separately illustrated, the CT delta current logic circuit 152 further includes additional CT current comparison logic circuits adapted to receive RMS current values of respective digitized current sample streams resulting from operation of the current transformers 56 and 58, as well as additional current transformers that may be coupling the current differential relay 100 to the protection zone 16. In addition, although only the CT current comparison logic circuit 157a will be discussed in detail, it should be noted that each of the individual CT current comparison logic circuits 157a to 157nn of the CT delta current logic circuit 152 are identically configured and operational. For example, referring again to FIG. 1, if five current transformers couple the current differential relay 100 to the power system 10, then the CT delta current logic circuit 152 may include five CT current comparison logic circuits 157a, 157b, 157c, 157d, and 157e.

Each of the number of CT current comparison logic circuits 157a to 157nn is configured to provide a corresponding first binary control signal Ndelt and a corresponding second binary control signal Delt, or a binary control signal pair, in response to changes in RMS current values, over time, of digitized current sample streams corresponding to the secondary current waveforms resulting from operation of its respective current transformer. For example, the CT current comparison logic circuit 157 is configured to provide a first binary control signal 173 $Ndelt_{o1}$ and a second binary control signal 174 $Delt_{o1}$ in response to comparisons of changes in RMS values of the digitized current sample steam resulting from operation of the current transformer 54. Similarly, the CT current comparison logic circuit 157nn is configured to provide an nn binary control signal pair having a first binary control signal 189 $Ndelt_{nn}$ and a second binary control signal 179 $Delt_{nn}$ in response to comparisons of changes in RMS values of the digitized current sample steam resulting from operation of the current transformer 60.

The zone selection logic circuit 154 selectively assigns the binary control signal pairs (e.g., the binary value of $Ndelt_{o1}$ and the binary value of $Delt_{o1}$), resulting from operation of the CT current comparison logic circuits 157a to 157nn, into one or more mm individual protection zones. For example, a first binary control signal pair $Ndelt_{o1}$ and $Delt_{o1}$ indicative of current transformer 54 operation may be assigned to Protection Zone 1, a second binary control signal pair $Ndelt_{o2}$ and $Delt_{o2}$ indicative of current transformer 56 operation may also be assigned to Protection Zone 1, and a third binary control signal pair $Ndelt_{o3}$ and $Delt_{o3}$ indicative of current transformer 58 operation may be assigned to Protection Zone 2. Although a number of open CT identity logic circuits 155a to 155mm corresponding to an equal number protection zones are illustrated, only one open CT identity logic circuit 155a corresponding to the protection zone 16 will be discussed in detail below.

Referring again to FIG. 4, each of the plurality of open CT identity logic circuits 155a to 155mm corresponds to one of the mm individual protection zones, and is configured to receive the binary control signal pairs assigned to it by the zone selection logic circuit 154. In general, each of the open CT identity logic circuits 155a to 155mm is configured to provide a third binary control signal upon receipt of their assigned binary control signal pairs. The value of, and number of sequential occurrences of, the third binary control signal are determinative of whether a lost CT signal is declared for a particular protection zone (i.e., an open CT condition exists in that particular zone) and whether trip signal generation by the current differential relay 100 is prevented.

In general, during operation of the lost CT signal detection and identification scheme 150, a first value, or logic high value (e.g., 1), for only one of the first binary control signals of the number of binary control signal pairs assigned to a protection zone indicates a possible loss of the CT signal. The lost CT signal corresponds to one of the CT current comparison logic circuits 157a to 157nn that provided the first binary control signal having the first value (if other conditions are present as discussed below). For example, a logic high value for a first binary control signal $Ndelt_{o1}$ 173 of the CT current comparison logic circuit 157a indicates a possible lost specific CT signal corresponding to the CT current comparison logic circuit 157a, if the logic high value persists for a predetermined time period and if other conditions are present.

More specifically, for all of the binary control signal pairs assigned to the protection zone 16, when only one of the first binary control signals of the binary control signal pairs has a first value, or logic high and all of the second binary control signals of the binary control signal pairs have the second value, a third binary control signal 186 provided by the open CT identity logic circuit 155a has the first value when a switching condition is not asserted. If such conditions persist for a predetermined number of power system cycles, (a) a lost CT signal is declared for the CT signal corresponding to the CT current logic circuit that provided the first binary control signal having the first value, (b) the associated CT is identified, and (c) the current differential relay 100 is prevented from issuing a trip signal to an associated circuit breaker. Conversely, when any of the second binary control signals of the binary control signal pairs have the first value, and/or zero or more of the first binary control signal(s) has the first value, the third binary control signal has the second value, or a logic low. As a result, the current differential relay 100 is not prevented from issuing a trip signal to an associated circuit breaker. In other words, because the second binary control signal(s) having the first value may be indicative of a fault or other abnormal condition in an electrical conductor of the monitored protection zone, for example, the protection zone 16, the current differential relay 100 is not prevented from isolating the faulted electrical conductor from the power system 10.

Referring specifically to one of the CT current comparison logic circuits of FIG. 4, the CT current comparison logic circuit 157a includes a CT specific delta current logic circuit 159 configured to provide the first binary control signal 173 and the second binary control signal 174 (or a binary control signal pair) in response to comparisons at a second time of a first RMS value 163 of the corresponding digitized current sample stream sampled at a first time, to a second RMS value 160 of the corresponding digitized current sample stream sampled at the second time. In an embodiment, the second time occurs two power system cycles after the first time, however, other power system cycle time intervals are contemplated. Thus, the first RMS value may be viewed as an "aged" RMS value, and the second RMS value may be viewed as a "present" RMS value, where a positive or negative change between the aged RMS value and the present RMS value provides an indication of a current change in the protection zone 16. The current change may be the result of a short circuit or other fault, or may be the result of an open CT condition.

The CT current comparison logic circuit 157a also includes a history buffer 162 and an enable logic circuit 193 coupled to the CT specific delta current logic circuit 159. The history buffer 162 is configured to provide the first RMS value 163 to the CT specific delta current logic circuit 159 at the second time. The enable logic circuit 193 is configured to enable operation of the CT specific delta current logic circuit 159 when the first RMS value 163 is greater than a first pre-determined percentage 179 of a nominal current rating of the current differential relay 100. In an embodiment, the first pre-determined percentage is selected to be 5%. Accordingly, operation of the CT specific delta current logic circuit 159 is enabled when the first RMS value 163 is greater than 5% of a nominal current rating of the current differential relay 100. Although the first pre-defined percentage is preferably 5%, it is contemplated that other percentage values may be utilized for purposes of enabling operation of the CT specific delta current logic circuit 159.

The CT specific delta current logic circuit 159 includes a first comparator 172 having a first and a second input. The first input of the first comparator 172 is adapted to receive a delta current value 165 resulting from subtracting the first RMS value 163 from the second RMS value 160. The delta current value 165 is equivalent to a change in the RMS value of the corresponding digitized current sample stream, over two power system cycles. The second input of the first comparator 172 is adapted to receive a negative second pre-determined percentage 191 of the first RMS value 163. As a result of the comparison of the delta current value 165 with the negative second pre-determined percentage of the first RMS value 163, the first comparator 172 provides the first binary control signal 173 of the binary control signal pair corresponding to operation of the current transformer 54.

More specifically, when the delta current value 165 is less than the negative second pre-determined percentage 191 of the first RMS value 163, the first binary signal 173 has the first value. For example, if the negative second pre-determined percentage 191 is selected to be −50%, then the first binary control signal 173 will be a logic high when the delta current value 165 is less than −50% of the first RMS value 163. In other words, if a change in the RMS current value over two power system cycles is a decrease of greater than 50%, the first binary control signal 173 $Ndelt_{01}$, will assert. Other values for the negative second pre-determined percentage 191 may also be selected.

The CT specific delta current logic circuit 159 also includes a second comparator 170 and a first AND-gate 178. The second comparator 170 has a first input adapted to receive a third pre-determined percentage 168 (e.g., 5%) of the first RMS value 163, and a second input adapted to receive an absolute value of the delta current value 165. During operation, a binary logic output signal 171 of the second comparator 170 will have the first value when the absolute value of the delta current value 165 is greater than the third pre-determined percentage 168 of the first RMS value 163. In other words, the binary logic output signal 171 from the second comparator 170 will be a logic high when a change in the RMS current value over two power system cycles is greater than or less than 5% of the aged, or first, RMS value. Other values for the third pre-determined percentage may also be selected.

The first AND-gate 178 has a first input adapted to receive an inverse of the first binary control signal $Ndelt_{01}$ 173, and has a second input adapted to receive the binary logic output signal 171 from the second comparator 170. The first AND-gate 178 is configured to provide the second binary control signal $Delt_{01}$ 174. During operation, the second binary control signal 174 has the first value when the binary logic output signal 171 has the first value and the first binary control signal 173 has the second value (e.g., a logic low). Further, as a result of operation of the first AND-gate 178, the first value for the first binary control signal 173 prevents occurrence the first value for the second binary control signal 174. In other words, assertion of only the first binary control signal 173, indicating a possible open CT condition in a corresponding current transformer, prevents assertion of the second binary control signal 174. Conversely, assertion of one or more of the second binary control signals Delt of the binary control signal pairs assigned to the protection zone 16 indicates a possible fault in the protection zone 16.

Each of the binary control signal pairs are selectively routed, via the zone selection logic circuit 154, to one of the open CT identity logic circuits 155a to 155mm. Referring to FIG. 4, the open CT identity logic circuit 155a associated with the protection zone 16 includes a summation-gate 180. The summation-gate 180 is configured to provide a binary summation-gate output signal 183 in response to receipt of all of the first binary control signals (i.e., $Ndelt_{01}$, to $Ndelt_{nn}$) of the binary control signal pairs assigned to the open CT identity logic circuit 155a. The binary summation-gate output signal 183 has the first value when exactly one of the first binary control signals 173 has the first value. If zero or more of the first binary control signals has the first value, the binary summation-gate output signal 183 will have the second value. Thus, unlike an OR-gate having a logic high output when at least one input signal is a logic high, the summation-gate 180 provides an output having a logic high when exactly one of the first binary control signals is a logic high.

The open CT identity logic circuit 155a also includes an OR-gate 181 and a second AND-gate 185. The OR-gate 181 is configured to provide a binary OR-gate output signal 184 in response to receipt of any of the second binary control signals (i.e., $Delt_{01}$ to $Delt_{nn}$) of the binary control signal pairs assigned to the open CT identity logic circuit 155a. The second AND-gate 185 is configured to provide the third binary control signal 186, and includes a first input adapted to receive the binary summation-gate output signal 183, a second input adapted to receive an inverse of the binary OR-gate output signal 184, and a third input adapted to receive the inverse of a binary switch signal 182.

The binary switch signal 182 is configured to have the first value during reassignment of any of the CT signals and/or during reassignment of any of the binary control signal pairs to the open CT identity logic circuit 155a. Thus, the inverse of an assertion of the binary switch signal 182 during reassignment or disconnect switch opening or closing, will provide a logic low to the AND-gate, thereby preventing assertion of the third binary control signal 186.

During operation of the AND-gate 185, the third binary control signal 186 will have the first value when (1) the binary summation-gate output signal 183 has the first value, indicating an open CT condition, (2) all of the second binary control signals have the second value, indicating no fault condition, and (3) the binary switch signal 182 has the second value, indicating that no reassignment or switching is underway.

In order to verify an occurrence of an open CT condition, the open CT identity logic circuit 155a further includes a security timer 187 adapted to receive the third binary control signal 186 and to provide a binary timer output signal 194. The security timer 187 is configured to increment by one count each time the third binary control signal 186 has the first value. When a predetermined number of counts has been reached (e.g., 4 sequential occurrences of the third binary control signal 186 having the first value), the binary timer output signal 194 has the first value.

In an embodiment, each of the open CT identity circuits includes a third AND-gate having a first input adapted to receive the third binary control signal and having a second input adapted to receive the binary timer output signal. For example, the open CT identity logic circuit 155a includes a third AND-gate 196 having a first input adapted to receive the third binary control signal 186 and having a second input adapted to receive the binary timer output signal 194. The third AND-gate 196 is configured to enable the first binary control signal having the first value to be loaded to a buffer of the microcontroller 130 if (1) the third binary control signal 186 has the first value and (2) the binary counter output signal 194 has the first value. Accordingly, if (1) only the first binary control signal $Ndelt_{01}$ has the first value, (2) all of the second binary control signals $Delt_{01}$ to $Delt_{nn}$ have the second value, and (3) the binary switch signal 182 has the second value, for (4) a predetermined number of counts (e.g., power system cycles), $Ndelt_{01}$ is loaded into the buffer of the microcontroller 130. As a result, the lost CT signal corresponding to $Ndelt_{01}$ and its associated CT are identified.

Each of the open CT identity logic circuit 155a-155mm further include the set-reset flip flop, or an SR latch, to "seal in" an indication of the lost CT signal until proper steps are taken to rectify the associated open CT condition. Referring to the open CT identity logic circuit 155a, the SR latch 156 includes a set input S adapted to receive the binary timer output signal 194 from the security timer 187, a reset input R adapted to receive a reset logic equation output 188, and an open transformer binary output signal 190 responsive to selective assertion of one of the set input S and the reset input R. The open transformer binary output signal 190 provides an indication of the loss of the specific CT signal when the set input S is asserted where assertion of the set input prevents issuance of a trip signal by the protective relay, and provides an indication of no loss of a CT signal when the reset input R is asserted. During operation, the set input S is asserted when the binary timer output signal 194 has the first value upon the security timer 187 reaching a pre-defined number of counts. The set input S may only remain asserted for a time equal to the predetermined number of power cycles between the first time and the second time. The reset input R is asserted when the reset logic equation output 188 has the first value.

As mentioned above, the lost CT signal detection and identification scheme 150 includes the zone selection logic circuit 154, selectively coupling the open CT identity logic circuits 155a to 155mm to the binary control signal pairs of the CT current comparison logic circuits 157a to 157nn. In general, the zone selection logic 154 is configured to assign the CT signals, (i.e., the secondary current waveforms 74, 76, 78 to 80), as well as the first and second binary control signals (or binary control signal pairs) to the various protection zones of the power system 10.

More specifically, the zone selection logic circuit 154 is configured to allow a user to predefine protection zone selection in cases where the protection zone does not change. Examples of such non-changing protection zones include power transformer protection zones, power lines or single bus protection zones. Conversely, in multiple protection zone bus zones, CT signals may be dynamically assigned to different protection zones, depending on the configuration of the power system 10. Similarly, the zone selection logic circuit 154 is also configured to assign each first binary control signal and second binary control to the appropriate protection zone. Thus, the zone selection logic circuit 154 determines which of the first and second binary control signals are received by each of the open CT identity logic circuits 155a-155mm.

As illustrated in FIG. 4, each of the CT signals associated with the CT current comparison logic circuits 157a to 157nn and their resulting first and second binary control signals are pre-assigned to one zone (e.g., to protection zone 16) prior to operation of the lost CT signal detection and identification scheme 150. It is contemplated however, that each of the CT signals associated with the CT current comparison logic circuits 157a to 157nn and their resulting first and second binary control signals may be dynamically assigned to zones during operation of the lost CT signal detection and identification scheme 150. In that case, there may be additional open CT identity logic circuits, each having a corresponding S/R latches and each having an open transformer binary output signal 190 (e.g., OCTZ1, OCTZ2, etc.)

Figure 5:
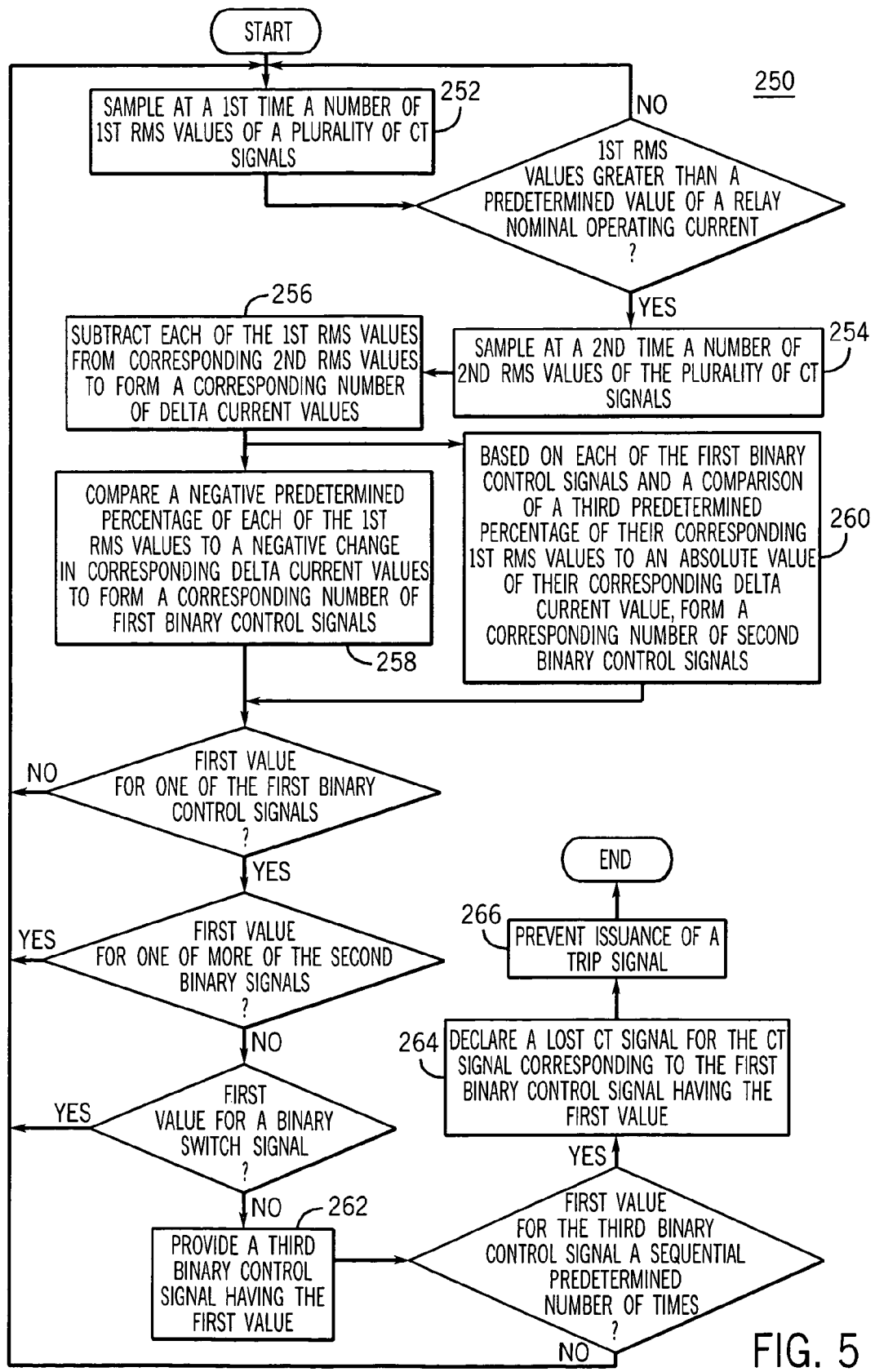
FIG. 5 is a flowchart of a method for detecting and identifying a loss of a current transformer signal and its associated current transformer in the protection zone of FIG. 2, according to an embodiment of the invention.

FIG. 5 is a flowchart of a method 250 for detecting and identifying a lost CT signal and its associated CT according to an embodiment of the invention. The lost CT signal is detected and identified from among a number of CT signals provided by a number of CTs coupling the current differential relay 100 to the protection zone 16. Although executed by the microprocessor 132 of the current differential relay 100, it is contemplated that the method 250 may be executed by an FPGA or the like, and/or may be executed in another type of power system protective device requiring coupling to the power system via a number of step-down transformers.

The method 250 begins when the microprocessor 132 samples, at a first time, a number of first RMS values of digitized current sample streams corresponding to the number of CT signals (step 252). Next, if the microprocessor determines that each of the number of first RMS values is greater than a first pre-determined value of a nominal operating current of the current differential relay 100, the microprocessor 132 samples, at a second time, a number of second RMS values of the digitized current sample streams corresponding to the number of CT signals (step 254). The second time is a predetermined number of power system cycles after the first time. Thus, for each of the CTs, the microprocessor 132 utilizing a corresponding digitized current sample stream, calculates a first RMS value at a first time and a second RMS value at a second time.

The microprocessor 132 then calculates a number of delta current values by subtracting each of the first RMS values from their corresponding second RMS values (step 256). Thus, a first RMS value and its corresponding second RMS value are used to form a corresponding delta current value of its digitized current sample stream. In general, a large positive delta current value indicates that a corresponding CT signal may be increasing; a large negative delta current value indicates that the corresponding CT signal may be decreasing, and a small positive or negative delta current value indicates that the corresponding CT signal may be relatively stable.

Next, the microprocessor 132 compares a negative second pre-determined percentage of each of the first RMS values to a negative corresponding delta current value to form a corresponding number of first binary control signals $Ndelt_{o1}$ to $Ndelt_{nn}$ (step 258). A first binary control signal has a first value (e.g., a logic 1 or high) when its corresponding delta current value is less than the negative second pre-determined percentage of its corresponding first RMS value. Conversely, a first binary control signal has a second value (e.g., a logic 0 or low) when its corresponding delta current value is greater than the negative second pre-determined percentage of its corresponding first RMS value.

The microprocessor 132 also forms a corresponding number of second binary control signals $Delt_{o1}$ to $Delt_{nn}$ where each of the second binary control signals is based on a corresponding first binary control signal and a comparison of a third pre-determined percentage of the corresponding first RMS value to an absolute value of the corresponding delta current value (step 260). A first binary control signal and its corresponding second binary control signal form a binary control signal pair. In an embodiment, the first pre-determined percentage is five percent, the negative second pre-determined percentage is negative-fifty percent, and the third pre-determined percentage is five percent. As will be appreciated by those skilled in the art, the first pre-determined percentage, the negative second pre-determined percentage, and the third pre-determined percentage may vary, depending on the desired sensitivity of the lost CT signal detection and identification scheme.

A second binary control signal has the first value when the absolute value of the corresponding delta current value is greater than the third pre-determined percentage of the corresponding first RMS value, and the corresponding first binary control signal has the second value. Conversely, a second binary control signal has the second value when the absolute value of the corresponding delta current value is less than the third pre-determined percentage of the corresponding first RMS value.

In addition, using the binary control signal pairs, the microprocessor 132 provides a third binary control signal. The value of the third binary signal is based on the values of the first and second binary control signals of the binary control signal pairs. For example, the third binary control signal has the first value when (1) only one of the first binary signals has the first value, when (2) all of the second binary signals have the second value and (3) when a binary switch signal has the second value (or when the binary switch signal does not have the first value). The binary switch signal has the first value during reassignment of any of the CT signals and during reassignment of any of binary control signal pairs.

When one of the first binary control signals has the first value, when all of the second binary control signals has the second value, and when the binary switch signal has the second value, the microprocessor 132 provides the third binary control signal having the first value (step 262). If the third control signal has the first value for a predetermined number of sequential counts, the microprocessor 132 declares a specific lost CT signal and identifies the corresponding CT (step 264), provides an indication of the loss of the specific CT signal and prevents issuance of a trip signal by the protective relay (step 266).

As may be apparent from the above discussion, implementation of the apparatus and method disclosed herein detects and identifies a specific lost CT signal and its associated CT coupling the protective device to a protection zone, and further prevents the protective device from misoperating (e.g., generating a trip signal) when the lost CT signal is detected. Implementation of the apparatus and method disclosed herein also enables identification of the lost CT signal, even when its associated current is very small. The embodiments of the apparatus and method disclosed herein are applicable to a variety of protective devices configured to protected a wide range of power system elements such as electrical generators, electrical motors, power transformers, power transmission lines, buses and capacitors, to name a few. Further, the embodiments of the apparatus and method disclosed herein may be utilized in a variety of suitable applications such as generating an alarm to notify personnel of a lost CT signal, or preventing a trip signal from being erroneously generated when no actual fault exists in the protection zone.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. For example, using the inventive principles disclosed herein, logic gate substitutions to the exemplary logic gate configuration of FIG. 4 may be used to detect and identify a lost current transformer signal and its associated current transformer. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus in a protective device for identifying a loss of a specific current transformer (CT) signal of a plurality of CT signals, the plurality of CT signals provided to the protective device by a corresponding plurality of CTs coupling the protective device to at least one protection zone of a power system, the apparatus comprising:

a plurality of first logic circuits, each of the plurality of first logic circuits configured to provide a binary control signal pair having a first binary control signal and a second binary control signal in response to comparisons of a first RMS value of a digitized current sample stream of a corresponding CT signal sampled at first time to a second RMS value of the digitized current sample stream sampled at a second time; and at least one second logic circuit operatively coupled to the plurality of first logic circuits and configured to provide a third binary control signal in response to receipt of the plurality of binary control signal pairs, a first value for only one of the plurality of first binary control signals and a second value for all of the second binary control signals and the first value for the third binary control signal for a pre-defined time interval indicating the loss of the specific CT signal corresponding to the first logic circuit providing the first binary control signal having the first value and preventing issuance of a trip signal of the protective device.

2. The apparatus of claim 1, wherein each of the at least one second logic circuit is associated with a protection zone of the at least one protection zone of the power system.

3. The apparatus of claim 2, further comprising a third logic circuit operatively coupling the plurality of first logic circuits to the at least one second logic circuit, the third logic circuit configured to assign the plurality of CT signals and the plurality of binary control signal pairs to a second logic circuit of the at least one second logic circuit prior to detecting and identifying the loss of the specific CT signal.

4. The apparatus of claim 1, wherein the first value for more than one of the plurality of second binary control signals indicates a potential fault condition in the power system.

5. The apparatus of claim 1, wherein the first value for the first binary control signal prevents occurrence the first value for the corresponding second binary control signal.

6. The apparatus of claim 1, wherein each of the plurality of first logic circuits comprises:
 a CT specific delta current logic circuit configured to provide the first binary control signal and the second binary control signal; and
 a history buffer coupled to the CT specific delta current logic circuit, the history buffer configured to provide the first RMS value to the CT specific delta current logic circuit at the second time, the second time occurring a predetermined number of power system cycles after the first time.

7. The apparatus of claim 6, wherein the predetermined number of power system cycles comprises two power system cycles.

8. The apparatus of claim 6, wherein each of the plurality of first logic circuits further comprises an enable logic circuit coupled to the CT specific delta current logic circuit, the enable logic circuit configured to enable operation of the CT specific delta current logic circuit when the first RMS value is greater than a first pre-determined percentage of a nominal current rating of the protective device.

9. The apparatus of claim 8, wherein the CT specific delta current logic circuit comprises:
 a first comparator having a first input adapted to receive a delta current value resulting from subtracting the first RMS value from the second RMS value and having a second input adapted to receive a negative second pre-determined percentage of the first RMS value, the first comparator providing the first binary control signal having the first value when a negative change in the delta current value is less than the negative first pre-determined percentage of the first RMS value;
 a second comparator having a first input adapted to receive a third pre-determined percentage of the first RMS value and having a second input adapted to receive an absolute value of the delta current value, the second comparator providing a binary logic output signal having the first value when the absolute value of the delta current value is greater than the second pre-determined percentage of the first RMS value; and
 a first AND-gate having a first input adapted to receive an inverse of the first binary control signal and having a second input adapted to receive the binary logic output signal, the first AND-gate providing the second binary control signal having the first value when the binary logic output signal has the first binary value and the first binary control signal has the second value.

10. The apparatus of claim 9, wherein the first pre-determined percentage comprises five percent, wherein the negative second pre-determined percentage comprises negative-fifty percent, and wherein the third pre-determined percentage comprises five percent.

11. The apparatus of claim 1, wherein each of the at least one second logic circuit comprises:
 a summation-gate configured to provide a binary summation-gate output signal in response to receipt of the plurality of first binary control signals, the binary summation-gate output signal having the first value when only one of the plurality of first binary control signals has the first value;
 an OR-gate configured to provide a binary OR-gate output signal in response to receipt of the plurality of second binary control signals; and
 a second AND-gate having a first input adapted to receive the binary summation-gate output signal and having a second input adapted to receive an inverse of the binary OR-gate output signal and having a third input adapted to receive a binary switch signal, the binary switch signal having the first value during reassignment of any of the plurality of CT signals and during reassignment of any of the plurality of first binary control signals and during reassignment of any of the plurality of second binary control signals.

12. The apparatus of claim 11, wherein the third binary control signal has the first value when the binary summation-gate output signal has the first value and the plurality of second binary control signals has the second value and the binary switch signal has the second value.

13. The apparatus of claim 11, wherein each of the at least one second logic circuit further comprises a security timer adapted to receive the third binary control signal and to provide a binary timer output signal, the security timer incrementing by one count each time the third binary control signal has the first value.

14. The apparatus of claim 13, wherein each of the at least one second logic circuit further comprises a set-reset flip flop having a set input adapted to receive the binary timer output signal from the security timer and having a reset input adapted to receive a binary logic equation output, the set reset flip-flop configured to provide an open transformer binary signal in response to selective assertion of one of the set input and the reset input, the open transformer binary signal providing an indication of the loss of the specific CT when the set input is asserted and providing an indication of no loss of the specific CT signal when the reset input is asserted, assertion of the set input preventing issuance of a trip signal by the protective device.

15. The apparatus of claim 14, wherein the set input is asserted when the binary timer output signal has the first value upon the security timer reaching the pre-defined time interval.

16. The apparatus of claim 14, wherein the set input is asserted for a maximum time equal to the predetermined number of power cycles between the first time and the second time.

17. The apparatus of claim 14, wherein the reset input is asserted when the binary logic equation output has the first value.

18. The apparatus of claim 14, wherein each of the at least one second logic circuit further comprises a third AND-gate configured to load the first binary signal having the first value to a buffer of the apparatus in response to receipt of the third binary control signal having the first value and receipt of the binary timer output signal having the first value.

19. The apparatus of claim 1, wherein the protective device comprises a protective relay.

20. The apparatus of claim 19, wherein the protective relay comprises a current differential relay.

21. The apparatus of claim 1, wherein the power system comprises a three phase power system.

22. An apparatus for identifying a loss of a specific current transformer (CT) in a power system, the apparatus comprising:
 a first logic circuit configured to provide a binary control signal pair having a first binary control signal and a second binary control signal in response to comparisons of a first RMS value of a digitized current sample stream of the CT signal sampled at first time to a second RMS value of the digitized current sample stream sampled at a second time; and a second logic circuit operatively coupled to the first logic circuit and configured to provide a third binary control signal in response to receipt of the binary control signal pair, a first value for the first binary control signal and a second value for the second binary control signal and the first value for the third binary control signal indicating the loss of the specific CT signal.

23. The apparatus of claim 22, wherein the second logic circuit is associated with a protection zone of the power system.

24. The apparatus of claim 23, wherein the first value for the second binary control signal indicates a potential fault in the protection zone.

25. The apparatus of claim 1, wherein of the first logic circuit:

a CT specific delta current logic circuit configured to provide the binary control signal pair; and a history buffer coupled to the CT specific delta current logic circuit, the history buffer configured to provide the first RMS value to the CT specific delta current logic circuit at the second time, the second time occurring a predetermined number of power system cycles after the first time.

26. The apparatus of claim 25, wherein the first logic circuits further comprises an enable logic circuit coupled to the CT specific delta current logic circuit, the enable logic circuit configured to enable operation of the CT specific delta current logic circuit when the first RMS value is greater than a first pre-determined percentage of a nominal current rating.

27. The apparatus of claim 25, wherein the CT specific delta current logic circuit comprises:

a first comparator having a first input adapted to receive a delta current value resulting from subtracting the first RMS value from the second RMS value and having a second input adapted to receive a negative second pre-determined percentage of the first RMS value, the first comparator providing the first binary control signal having the first value when a negative change in the delta current value is less than the negative first pre-determined percentage of the first RMS value;

a second comparator having a first input adapted to receive a third pre-determined percentage of the first RMS value and having a second input adapted to receive an absolute value of the delta current value, the second comparator providing a binary logic output signal having the first value when the absolute value of the delta current value is greater than the second pre-determined percentage of the first RMS value; and a first AND-gate having a first input adapted to receive an inverse of the first binary control signal and having a second input adapted to receive the binary logic output signal, the first AND-gate providing the second binary control signal having the first value when the binary logic output signal has the first binary value and the first binary control signal has the second value.

28. The apparatus of claim 22, wherein the second logic circuit comprises:

a summation-gate configured to provide a binary summation-gate output signal in response to receipt of the first binary control signal, the binary summation-gate output signal having the first value when only the first binary control signal has the first value;

a second AND-gate having a first input adapted to receive the binary summation-gate output signal and having a second input adapted to receive an inverse of the second binary control signal and having a third input adapted to receive a binary switch signal, the binary switch signal having the first value during reassignment of the CT signal and during reassignment of the binary control signal pair; and a security timer adapted to receive the third binary control signal and to provide a binary timer output signal, the security timer incrementing by one count each time the third binary control signal has the first value.

29. The apparatus of claim 28, wherein the second logic circuit further comprises a set-reset flip flop having a set input adapted to receive the binary timer output signal and having a reset input adapted to receive a binary logic equation output, the set reset flip-flop configured to provide an open transformer binary signal in response to selective assertion of one of the set input and the reset input, the open transformer binary signal providing an indication of the loss of the specific CT when the set input is asserted and providing an indication of no loss of the specific CT signal when the reset input is asserted, assertion of the set input preventing issuance of a trip signal by the protective relay.

30. The apparatus of claim 29, wherein the second logic circuit further comprises a third AND-gate configured to load the first binary signal having the first value to a buffer of the apparatus in response to receipt of the third binary control signal having the first value and receipt of the binary timer output signal having the first value.

31. An apparatus for identifying a loss of a current transformer (CT) signal in a power system, the apparatus comprising:

a CT specific delta current logic circuit configured to provide a binary control signal pair having first binary control signal and a second binary control signal in response to comparisons of a first RMS value of a digitized current sample stream of the CT signal sampled at first time to a second RMS value of the digitized current sample stream sampled at a second time;

a history buffer coupled to the CT specific delta current logic circuit, the history buffer configured to provide the first RMS value to the CT specific delta current logic circuit at the second time, the second time occurring a predetermined number of power system cycles after the first time; and an enable logic circuit coupled to the CT specific delta current logic circuit, the enable logic circuit configured to enable operation of the CT specific delta current logic circuit when the first RMS value is greater than a first pre-determined percentage of a nominal current rating, a first value for the first binary control signal for a pre-defined time interval indicating the loss of the CT signal.

32. The apparatus of claim 31, wherein the predetermined number of power system cycles comprises two power system cycles.

33. The apparatus of claim 31, wherein the CT specific delta current logic circuit comprises:

a first comparator having a first input adapted to receive a delta current value resulting from subtracting the first RMS value from the second RMS value and having a second input adapted to receive a negative second pre-determined percentage of the first RMS value, the first comparator providing the first binary control signal having the first value when a negative change in the delta current value is less than the negative second pre-determined percentage of the first RMS value;

a second comparator having a first input adapted to receive a third pre-determined percentage of the first RMS value and having a second input adapted to receive an absolute value of the delta current value, the second comparator providing a binary logic output signal having the first value when the absolute value of the delta current value is greater than the second pre-determined percentage of the first RMS value; and a first AND-gate having a first input adapted to receive an inverse of the first binary control signal and having a second input adapted to receive the binary logic output signal, the first AND-gate providing the second binary control signal having the first value when the binary logic output signal has the first binary value and the first binary control signal has the second value.

34. The apparatus of claim 33, wherein the first pre-determined percentage comprises five percent, wherein the negative second pre-determined percentage comprises negative-fifty percent, and wherein the third pre-determined percentage comprises five percent.

35. The apparatus of claim 31, wherein the power system comprises a three phase power system, wherein the apparatus is included in a protective relay, and wherein the CT signal is secondary current signal generated by a current transformer coupling the protective relay to a protection zone of the power system.

36. A method for detecting and identifying a loss of a specific current transformer (CT) signal of a plurality of CT signals provided to a protective device by a corresponding plurality of CTs coupling the protective device to at least one protection zone of a power system, the method comprising:

providing a plurality of binary control signal pairs having a first binary control signal and a second binary control signal corresponding to the plurality of CT signals, each of the plurality of binary control signal pairs provided in response to comparisons of a first RMS value of a digitized current sample stream of a corresponding CT signal sampled at first time to a second RMS value of the digitized current sample stream sampled at a second time, the second time occurring a predetermined number of power system cycles after the first time; and providing a third binary control signal in response to receipt of the plurality of binary control signal pairs, a first value for only one of the first binary control signals and a second value for all of the second control signals and the first value for the third binary control signal for a pre-defined time interval indicating the loss of the specific CT signal corresponding to the only one of the first binary control signals having the first value.

37. The method of claim 36, wherein the first value for more than one of the plurality of second binary control signals indicates a potential fault condition in the power system.

38. The method of claim 36, wherein the first value for the only one of the plurality of first binary control signals prevents occurrence of the first value for a corresponding second binary control signal.

39. The method of claim 36, further comprising assigning the plurality of CT signals and the plurality of binary control signal pairs to a protection zone of the at least one protection zone prior to detecting and identifying the loss of the specific CT signal.

40. The method of claim 36, further comprising enabling detecting and identifying the loss of the specific CT signal when the first RMS value of the corresponding digitized current sample stream is greater than a first pre-determined percentage of a nominal current rating of the protective device.

41. The method of claim 40, wherein each of the plurality of first binary control signals is provided in response to comparing a delta current value to a negative second pre-determined percentage of a first RMS value of the corresponding digitized current sample stream, the delta current value resulting from subtracting the first RMS value of the corresponding digitized current sample stream from a second RMS value of the corresponding digitized current sample stream, a first binary control signal of the plurality of first binary control signals having the first value when a negative change in the delta current value is less than the negative second pre-determined percentage of the first RMS value of the corresponding digitized current sample stream.

42. The method claim 41, wherein each of the plurality of respective second binary control signals is provided in response to receiving a corresponding first binary control signal and a corresponding fourth binary control signal, each of the corresponding fourth binary control signals resulting from comparing a third pre-determined percentage of the first RMS value of the corresponding digitized current sample stream to an absolute value of the corresponding delta current value, and wherein each of the plurality of second binary control signals has the first value when the absolute value of the corresponding delta current value is greater than the third pre-determined percentage of the first RMS value of the corresponding digitized current sample stream, and the corresponding first binary control signal has the second value.

43. The method of claim 42, wherein the first pre-determined percentage comprises five percent, wherein the negative second pre-determined percentage comprises negative-fifty percent, and wherein the third pre-determined percentage comprises five percent.

44. The method of claim 42, further comprising:

providing a fifth binary control signal in response to receipt of the plurality of first binary control signals, the fifth binary control signal having the first value when the only one of the plurality of first binary control signals has the first value;

providing a sixth binary control signal in response to receipt of the plurality of second binary control signals, the sixth binary control signal having the first value when any one of the corresponding plurality of second binary signals has the first value; and providing the third binary control signal 186 based on the fifth binary control signal and the sixth binary control signal and a seventh binary control signal, the seventh binary control signal having the first value during reassignment of any of the plurality of CT signals and during reassignment of any of the plurality of binary control signal pairs.

45. The method of claim 44, further comprising providing the third binary control signal having the first value when the fifth binary control signal has the first value and when the plurality of second binary control signals has the second value and when the seventh binary control signal has the second value.

46. The method of claim 36, further comprising incrementing a security counter each time the third binary control signal has the first value.

47. The method of claim 46, further comprising:
providing an indication of the loss of the specific CT signal when the third binary control signal has the first value for the pre-defined time interval, the indication of the detection of the loss of the specific CT signal preventing issuance of a trip signal by the protective device; and
providing an indication of no detection of the loss of the CT signal when the third binary control signal does not have the first value for the pre-defined time interval.

48. An apparatus for detecting loss of a current transformer (CT) signal and blocking a trip signal when loss of the CT signal is detected, comprising:
an input of first RMS current values from a first CT in a protection zone;
an input of second RMS current values from a second CT in the protection zone;
a first logic circuit for asserting a binary control signal upon detecting a change in the first RMS current values that is greater than a first predetermined value and a change in the second RMS current values that is less than a second predetermined value; and
a second logic circuit for blocking a trip signal if the binary control signal is a first value.

49. The apparatus of claim 48, wherein the change in the second RMS current values is an absolute value of a difference between a present second RMS current value and a previous second RMS current value.

50. The apparatus of claim 49, wherein the previous second RMS current value is from two cycles previous to the present second RMS current value, and the second predetermined value is a product of the previous second RMS current value and a predetermined percentage.

51. The apparatus of claim 48, wherein the change in the first RMS current values is a difference between a present first RMS current value and a previous first RMS current value, and the first predetermined value is a product of the previous first RMS current value and a predetermined percentage.

52. The apparatus of claim 48, wherein the binary control signal is a first value when:
an absolute value of a difference between a previous second RMS current value and a present second RMS current value is less than the product of the previous second RMS current value and a first predetermined percentage; and
a difference between a present first RMS current value and a previous first RMS current value is greater than a product between the previous first RMS current value and a second predetermined percentage.

53. The apparatus of claim 48, wherein the second logic circuit further comprises a timer that increments by one count each time the binary control signal is the first value, and wherein the second logic circuit blocks the trip signal if the binary control signal is the first value and a predetermined number of counts has been reached by the timer.

54. The apparatus of claim 48, further comprising an enable logic circuit for enabling the first logic circuit if a previous first RMS current value is greater than a product of a predetermined percentage and an apparatus nominal current.

* * * * *